US009485821B2

(12) United States Patent
Li et al.

(10) Patent No.: US 9,485,821 B2
(45) Date of Patent: Nov. 1, 2016

(54) LED LIGHTING DRIVE CIRCUIT (71) Applicants: SICHUAN SUNFOR LIGHT CO., LTD., Sichuan (CN); UNIVERSITY OF ELECTRONIC SCIENCE AND TECHNOLOGY OF CHINA, Sichuan (CN)

(72) Inventors: Dongming Li, Sichuan (CN); Mian Yang, Sichuan (CN); Zhengyong Feng, Sichuan (CN); Wentao Long, Sichuan (CN); Ning Ning, Sichuan (CN); Dejun Yu, Sichuan (CN); Chunyi Feng, Sichuan (CN); Yongming Jia, Sichuan (CN)

(73) Assignees: SICHUAN SUNFOR LIGHT CO., LTD., Sichuan (CN); UNIVERSITY OF ELECTRONIC SCIENCE AND TECHNOLOGY OF CHINA, Sichuan (CN)

( * ) Notice: Subject to any disclaimer, the term of this patent is extended or adjusted under 35 U.S.C. 154(b) by 0 days.

(21) Appl. No.: 14/906,493

(22) PCT Filed: Jul. 21, 2014

(86) PCT No.: PCT/CN2014/082572
§ 371 (c)(1),
(2) Date: Jan. 20, 2016

(87) PCT Pub. No.: WO2015/010580
PCT Pub. Date: Jan. 29, 2015

(65) Prior Publication Data
US 2016/0165689 A1 Jun. 9, 2016

(30) Foreign Application Priority Data

Jul. 22, 2013 (CN) .......................... 2013 1 0309316

(51) Int. Cl.
H05B 33/08 (2006.01)
(52) U.S. Cl.
CPC ........ *H05B 33/0824* (2013.01); *H05B 33/083* (2013.01); *H05B 33/0809* (2013.01);*H05B33/089* (2013.01); *H05B 33/0845* (2013.01); *H05B 33/0887* (2013.01); *H05B 33/0896* (2013.01)

(58) Field of Classification Search
CPC .. H05B 37/02; H05B 37/029; H05B 37/032; H05B 37/036; H05B 33/0824; H05B 33/0845; H05B 33/083; H05B 33/0809; H05B 33/0815; H05B 33/089; H05B 33/0812; H05B 41/2828
See application file for complete search history.

(56) References Cited

U.S. PATENT DOCUMENTS 9,013,109 B2 * 4/2015 Chiang ................ H05B 33/083
315/185 R
9,246,403 B2 * 1/2016 Siessegger ......... H05B 33/0803
(Continued)

FOREIGN PATENT DOCUMENTS

CN 101137261 A 3/2008
CN 101668373 A 3/2010
(Continued)

OTHER PUBLICATIONS

International Search Report, issued in International Patent Application No. PCT/CN2014/082572, mailed Oct. 27, 2014.

*Primary Examiner* — Vibol Tan
(74) *Attorney, Agent, or Firm* — Michael Ye; Andrews Kurth Kenyon LLP (57) ABSTRACT

An LED lighting drive circuit supplies power for N groups of LED loads. The LED lighting drive circuit comprises N current paths, N groups of LEDs, and a constant current section. The LED lighting drive circuit enables the current of LED lamps to change in a sinusoidal half-wave form with the utility AC input, and keeps the current a constant effective value.

10 Claims, 3 Drawing Sheets

(56) References Cited

U.S. PATENT DOCUMENTS

| | | | |
|---|---|---|---|
| 2010/0194298 A1* | 8/2010 | Kuwabara | H05B 33/083 315/186 |
| 2012/0068714 A1 | 3/2012 | Wang et al. | |
| 2013/0093340 A1* | 4/2013 | Horino | H05B 33/0851 315/193 |
| 2013/0099683 A1* | 4/2013 | Sakuragi | H05B 33/083 315/185 R |
| 2014/0265899 A1* | 9/2014 | Sadwick | H05B 33/0812 315/200 R |

FOREIGN PATENT DOCUMENTS

| | | |
|---|---|---|
| CN | 101754541 A | 6/2010 |
| TW | M408216 U | 7/2011 |
| WO | 2012/138200 A2 | 10/2012 |

* cited by examiner

LED LIGHTING DRIVE CIRCUIT

TECHNICAL FIELD

The present invention relates to the technical field of digital-analogue hybrid integrated circuit, and more particularly, to an LED lighting drive circuit.

BACKGROUND

High-power LED, by virtue of its advantages of high efficiency, energy conservation, environmental protection, long service life and high reliability, has become a new generation of lighting source and are gradually replacing conventional incandescent lamps and fluorescent lamps etc. With improvement of performances and reduction of production cost, application areas of high-power lighting LEDs have expanded from screen backlight sources and brightness insensitive landscape lightings to general white lighting. On the other hand, drive integrated circuits matched with high-power LED have been considerably developed due to the increasing popularity of the high-power LED applications. Therefore, it is particularly critical to design an efficient and reliable LED lighting drive circuit.

In order to improve the efficiency of the power grid, power factors of lighting devices have been paid more and more attention. Power factor of a lighting device is optimal when an input current of the lighting device varies in a sinusoidal form with voltage of the commercial electric supply. In addition, since a luminous intensity of an LED is proportional to a current passing through the LED within a certain range, in order to ensure the service life and the lighting effect of LED lights, the current passing through the LED is required to be within a certain range and be kept at a constant effective value.

A conventional LED lighting drive circuit generally employs a bulky transformer to transfer power, which takes much space. Moreover, it employs high-voltage electrolytic capacitors with polarities, and the lifetime of the elements will be dramatically shortened after a period of operation, resulting in poor reliability of the product.

With respect to the above defects of the conventional LED lighting drive circuit, there is a demand to develop an LED drive circuit without a transformer for converting power and high-voltage electrolytic capacitors, while having a high power factor.

SUMMARY OF THE INVENTION

In order to overcome the defects in the conventional circuit, the present invention provides a novel LED lighting drive circuit, which is a novel circuit structure without a transformer for power conversion, without a high-voltage electrolytic capacitor while having a high power factor, and can drive a high-voltage LED with a current of a constant effective value.

According to one aspect of the present invention, there is provided an LED lighting drive circuit, configured to supply power to N groups of LED loads, the LED lighting drive circuit including N current paths, N groups of LEDs, and a constant current section, N being an integer no less than 2. The N current paths include: a voltage dividing section, connected to a half sine wave power supply, and configured to reduce a supply voltage of each of the N current paths to a voltage available for a corresponding current path; a comparator section, including N comparators for the N current paths, each of the comparators having an input terminal connected to an output terminal of the voltage dividing section, and another terminal connected to a reference voltage, and configured to output a control signal when a voltage varies; a logic control section, having N input terminals connected to N output terminals of the comparator section and configured to output N enabling signals according to the control signal outputted by the comparator section; a power drive section, having N input terminals connected to N output terminals of the logic control section and configured to provide N voltages according to the N enabling signals; and a switch section, including N switch elements, the N switch elements having N input terminals connected to N output terminals of the power drive section and configured to be switched off or on and thereby to control the N groups of LEDs to be turned on or off according to the N voltages provided by the power drive section, wherein the logic control section controls the N switch elements of the N current paths to be successively switched off and successively switched on through logic control, a first group of LEDs of the N groups of LEDs has a terminal connected to the power supply and another terminal connected to a first current path and a terminal of a second group of LEDs; an $i^{th}$ group of LEDs has a terminal connected to an $(i-1)^{th}$ group of LEDs and an $(i-1)^{th}$ current path, and another terminal connected to an $(i+1)^{th}$ group of LEDs and an $i^{th}$ current path; an $N^{th}$ group of LEDs has a terminal connected to an $(N-1)^{th}$ group of LEDs and an $(N-1)^{th}$ current path, and another terminal connected to an $N^{th}$ current path, where $2 \leqslant i \leqslant (N-1)$, and the constant current section is connected between the power supply and the switch section such that a current passing through the N groups of LEDs varies in a half sine wave form with input power supply and has an effective value being kept constant.

According to another aspect of the present invention, wherein the voltage dividing section includes N voltage dividing resistors connected in series between the power supply and a ground, except that a first voltage dividing resistor R1 is only connected to a comparator of the first current path at its negative terminal close to a ground terminal, an $i^{th}$ voltage dividing resistor Ri is connected to a comparator of the $(i-1)^{th}$ current path at its positive terminal close to a power supply terminal and connected to a comparator of the $i^{th}$ current path at its negative terminal, where $i \leqslant N$.

According to another aspect of the present invention, wherein each of the comparators in the comparator section has a positive terminal connected to a negative terminal of a voltage dividing resistor of a corresponding current path, and a negative terminal connected to a constant reference voltage, when the supply voltage increases, voltages at the positive terminals of the N comparators successively increase to be higher than the reference voltage, such that the N comparators successively output a high voltage level; and when the supply voltage decreases, voltages at the positive terminals of the N comparators successively decrease to be lower than the reference voltage, such that the N comparators successively output a low voltage level.

According to another aspect of the present invention, wherein the logic control section sequentially includes one NOR gate in the first current path, one NOR gate and two inverters in each of the $i^{th}$ current path, where $2 \leqslant i \leqslant (N-1)$, and three inverters in the $N^{th}$ current path, each NOR gate has an input terminal connected to the output terminal of a comparator in a corresponding current path and another input terminal connected between two inverters close to the output terminal of the logic control section.

According to another aspect of the present invention, wherein the switch elements are power MOS tubes, each of the power MOS tubes has a gate electrode connected to an output terminal of the power drive section to control the power MOS tube to be switched on and off according to an enabling signal, a drain electrode connected to the N groups of LEDs, and a source electrode connected to an output terminal of the constant current section.

According to another aspect of the present invention, wherein the constant current section includes: voltage dividing resistors Ra and Rb, an error amplifier, a power MOS tube and a sampling resistor connected in series between the power supply and a ground, the error amplifier has a positive terminal connected between the resistors Ra and Rb, a negative terminal connected to a source electrode of the power MOS tube and a terminal of the sampling resistor, and an output terminal connected to a gate electrode of the power MOS tube; another terminal of the sampling resistor is connected to the ground; and a drain electrode of the power MOS tube serves as an output terminal connected to the switch section.

According to another aspect of the present invention, wherein resistance of the resistor R1 is much larger than that of the resistor Ri, where i≤N and resistance of the resistor Ra is much larger than that of the resistor Rb.

According to another aspect of the present invention, wherein the Power MOS tubes are all high-voltage power tubes which can endure a voltage larger than a maximum threshold of each group of LEDs.

According to another aspect of the present invention, wherein the reference voltage at the negative terminals of the comparators is supplied by other power supply module with a constant voltage.

According to another aspect of the present invention, wherein the constant current section outputs an instantaneous current:

$$I = \frac{V_{AMP}}{R_{set}}$$

where $V_{AMP}$ is an instantaneous voltage at a positive terminal of the error amplifier, and $R_{set}$ is a resistance of the sampling resistor.

The main operation process of the LED lighting drive circuit of the present invention is that: when the supply voltage (a half sine wave from a commercial electric supply through a bridge rectifier) is zero, all of the power MOS tubes M1~M5 are switched on. As the supply voltage gradually increases to reach the threshold voltage for turning on the first group of high-voltage LEDs, LED1 is turned on and the current flows to the ground through the tube M1 and the tube M6. The voltage continues to increase, and when the voltage reaches the threshold voltage for turning on the second group of high-voltage LEDs, due to the voltage dividing of the resistors, the voltage at the terminal VP1 of the comparator COMP1 firstly increases to be higher than the constant reference voltage at its terminal VREF. The output voltage level of the comparator COMP1 jumps, through the logic control, to switch off the power MOS tube M1. At this time, the power tubes M2, M3, M4 and M5 are remained as being switched on, and the first and second groups of high-voltage LEDs LED1 and LED2 are turned on. As the voltage continues to increase, and when the voltage reaches the threshold voltage for turning on the third group of high-voltage LEDs, due to the voltage dividing of the resistors, the voltage at the terminal VP2 of the comparator COMP2 increases to be higher than the constant reference voltage at its terminal VREF. The output voltage of the comparator COMP2 jumps, through the logic control, to switch off the power MOS tube M2. At this time, the power tubes M3, M4 and M5 are remained as being switched on, and the first, second and third groups of high-voltage LEDs LED1, LED2 and LED3 are turned on. And so on, the voltage continues to increase, and the comparators COMP3 and COMP4 successively give a response to, through the logic control, successively switch off the MOS tubes M3 and M4, and then the third, fourth and fifth groups of high-voltage LEDs are successively turned on. Afterwards, the voltage starts to decrease, the power tubes M4, M3, M2 and M1 are successively switched on again, and the high-voltage LED groups are successively turned off, and such cycle repeats. Since the variation frequency of voltage is faster than the recognition frequency of human eyes, flickering cannot be observed in the whole process. Moreover, with the increase and decrease of the voltage, the power tube M5 is always in a switch-on state.

It can be seen from the above operation of the circuit that, no voltage transformer is employed in the circuit. With the variation of the voltage, the high voltage LEDs are successively turned on, then successively turned off, and such cycle repeats. Since the variation frequency of the voltage is sufficiently faster than the recognition frequency of human eyes, and the effective value of the current is kept constant during the process, the whole LED matrix emits uniform and stable lights.

DETAILED DESCRIPTION OF THE INVENTION

In order to make objectives, technical solutions and advantages of the present invention more apparent, hereinafter, the present invention will be further described in detail with reference to specific embodiments and accompanying drawings. It should be understood that, the description are merely illustrative, and by no means limiting the scope of the present invention. In addition, in the following, description of well-known structures and techniques will be omitted to avoid obscuration of the idea of the present invention.

Figure 1:
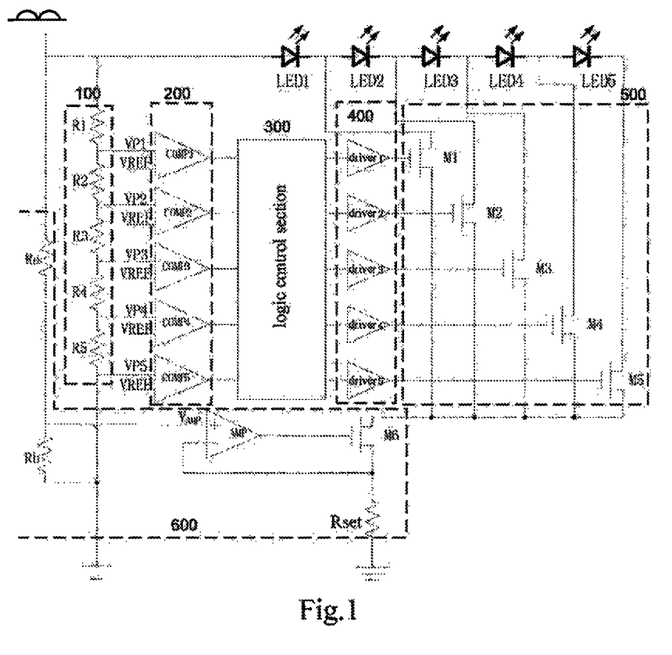
FIG. 1 is a circuit diagram of an LED lighting drive circuit according to the present invention.

FIG. 1 is a circuit diagram of an LED lighting drive circuit according to the present invention.

The LED lighting drive circuit of the present invention is configured to supply power to N groups of LED loads, and therefore includes N current paths (N is an integer no less than 2). The power supply to the entire circuit is of a half sine wave from a commercial electric supply through a bridge rectifier. In a preferred embodiment of the present invention, there are 5 groups of loads for example. However, the present invention is not limited thereto, and any N of groups of LED loads can be applied to the LED lighting drive circuit of the present invention, as long as the number of current paths is increased according to a similar principle.

As shown in FIG. 1, the LED lighting drive circuit includes N current paths and a constant current section 600. The N current paths respectively drive N groups of LED loads to emit lights. Each current path includes successively: a voltage dividing section 100, a comparator section 200, a logic control section 300, a power drive section 400 and a switch section 500.

The voltage dividing section 100 is connected to a power supply, and configured to reduce the voltage of the power supply to a voltage available for a corresponding current path. As shown in FIG. 1, the voltage dividing section 100 includes N voltage dividing resistors, for example R1~R5. These resistors are successively connected in series. Wherein the voltage dividing resistor R1 for a first path has a terminal connected to the power supply, and has a resistance much larger than the voltage dividing resistors R2~R5 for other paths. The voltage dividing resistor R5 for an $N^{th}$ path has a terminal connected to the ground. Except for the terminal of R1 which is connected to the power supply, a voltage dividing resistor Ri for an $i^{th}$ current path is connected to both of a positive terminal of a comparator COMPi of the corresponding path and a positive terminal of a comparator COMPi-1 of the previous path, where i=2, 3, 4, . . . , N. In the embodiment of FIG. 1, terminals of the resistors R2~R5 are respectively and successively connected to the positive terminals of the comparators COMP1, COMP2, COMP3, COMP4 and COMP5.

The comparator section 200 has an input terminal connected to an output terminal of the voltage dividing section 100, and is configured to output a corresponding control signal to the logic control section 300 when the voltage varies, to control the switch section 500 to be switched on and off, and in turn, to control LEDs in the paths to be turned on and off. As shown in FIG. 1, the comparator section 200 includes N comparators, for example COMP1~COMP5. These comparators respectively belong to a current path of one of the LED loads. Each of the comparators has a positive terminal connected to a negative terminal of a voltage dividing resistor of the corresponding current path. Each of the comparators has a negative terminal connected to a constant reference voltage VREF. Optionally, the reference voltage VREF can be supplied by other power supply module with a constant voltage which satisfies the input scope of the comparator, to ensure normal operation of the comparator.

Operation principle of the comparator section 200 is as follows. The voltage of the power supply varies. Due to the presence of the voltage dividing resistors, when the voltage increases, voltages (for example, VP1, VP2, VP3 and VP4) at the positive terminals of the comparators successively increase, until they are higher than the reference voltage VREF at the negative terminals of the comparators. The comparators COMP1, COMP2, COMP3 and COMP4 successively output high voltage levels to the logic control section LOGIC 300, in turn, to control power MOS tubes M1, M2, M3 and M4 in the switch section 500 to be successively switched off, such that LED strings of a successively increased number are turned on. When the voltage decreases, voltages at positive terminals of comparators successively decrease, until they are lower than the reference voltage VREF at the negative terminals of the comparators. The comparators COMP1, COMP2, COMP3 and COMP4 successively output low voltage levels to the logic control section LOGIC 300, in turn, to control the power MOS tubes M1, M2, M3 and M4 to be successively switched on, such that LED strings of a successively decreased number are turned on. In addition, a last comparator COMPN (for example the comparator COMP5) of the $N^{th}$ current path has the positive terminal VP5 connected to the ground, and its output is maintained at a low voltage level, such that the power MOS tube M5 of this path can be maintained as switched on. When each of the MOS tubes MN (N<5) is switched off, LED in the path corresponding to M5 is turned on; and when any one of the MOS tubes MN (N<5) is switched on, the LED in the path corresponding to M5 is turned off.

Figure 2:
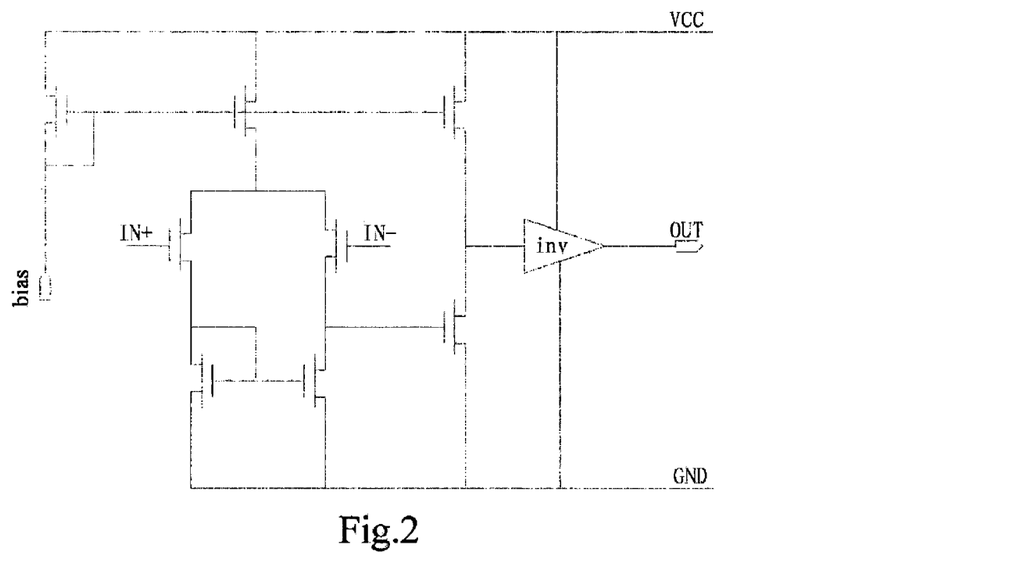
FIG. 2 is a preferred circuit diagram of a comparator in the LED lighting drive circuit according to the present invention.

FIG. 2 is a preferred circuit diagram of a comparator in the LED lighting drive circuit according to the present invention.

As shown in FIG. 2, a preferred comparator in the present invention can consist of two stages of operational amplifiers and inverters, wherein a first stage of the two stages of operational amplifiers is of a differential input single-terminal output structure, signals outputted from the operational amplifiers are outputted as logic signals after rectified by the inverters. The two stages of amplifiers amplify a difference between an input signal IN+ and an input signal IN−, and the amplified signal is rectified by the inverters to be output as a logic signal.

The logic control section 300 is connected to an output terminal of the comparator section 200 and includes a plurality of NOR gates and a plurality of inverters for controlling the successive turning on and off of the switch section 500 during the variation of the voltage.

Figure 3:
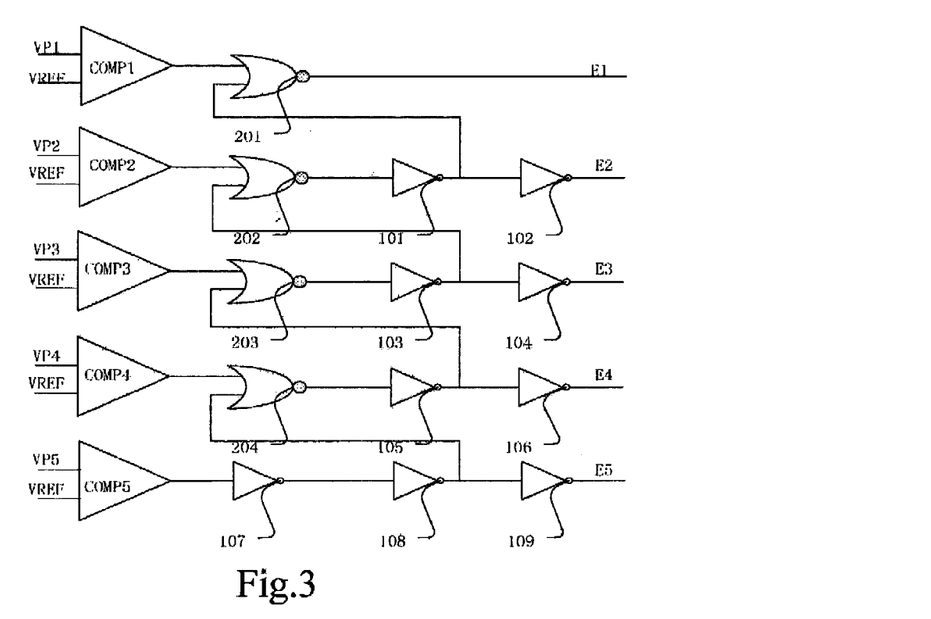
FIG. 3 is a preferred circuit diagram of a logic control section in the LED lighting drive circuit according to the present invention.

FIG. 3 is a preferred circuit diagram of a logic control section in the LED lighting drive circuit according to the present invention.

As shown in FIG. 3, the logic control section 300 includes NOR gates 201~204 and inverters 101~109. In addition, the logic control section 300 includes enable terminals E1, E2, E3, E4 and E5. Each of the enable terminals outputs a high voltage level or a low voltage level depending on the variation of the voltage. After being driven by power tube drivers 1~5, the outputs respectively control the power MOS tubes to be switched on or off, and in turn, to control the LED loads in the current paths to be turned on or off.

The NOR gate 201 in the first current path has an input terminal connected to the output terminal of the comparator COPM1 and another input terminal connected to an input terminal of the inverter 102 and an output terminal of the inverter 101 in the next current path (i.e. the second current path). The NOR gate 201 has an output terminal connected to the power tube driver 1 in the corresponding current path (i.e. the first current path).

The NOR gate 202 in the second current path has an input terminal connected to the output terminal of the comparator COPM2 and another input terminal connected to an input terminal of the inverter 104 and an output terminal of the inverter 103 in the next current path (i.e. the third current path). The NOR gate 202 has an output terminal connected to the first inverter 101 in the corresponding current path (i.e. the second current path). The second inverter 102 is connected to the power tube driver 2 in the corresponding current path.

The NOR gate 203 in the third current path has an input terminal connected to the output terminal of the comparator COPM3 and another input terminal connected to an input terminal of the inverter 106 and an output terminal of the inverter 105 in the next current path (i.e. the fourth current path). The NOR gate 203 has an output terminal connected to the first inverter 103 in the corresponding current path (i.e.

the third current path). The second inverter 104 is connected to the power tube driver 3 in the corresponding current path.

The NOR gate 204 in the fourth current path has an input terminal connected to the output terminal of the comparator COPM4 and another input terminal connected to an input terminal of the inverter 109 and an output terminal of the inverter 108 in the next current path (i.e. the fifth current path). The NOR gate 204 has an output terminal connected to the power tube driver 4 in the corresponding path (i.e. the fourth current path) via the first inverter 105 and the second inverter 106 in the fourth current path.

The logic control section of the N$^{th}$ current path (i.e. the fifth current path) includes three inverters 107, 108 and 109, wherein the first inverter 107 has an input terminal connected to the output terminal of the comparator COMP5, and an output terminal connected to the power tube driver 5 in the corresponding path (i.e. the fifth current path) via the second inverter 108 and the third inverter 109.

The power drive section 400 is connected to the output terminal of the logic control section 300, and configured to provide a gate voltage required by turning on and off a power MOS tube. As shown in FIG. 1, the power drive section 400 includes a plurality of power tube drivers, for example, drivers 1~5, respectively disposed in the first to fifth current paths. Each of the drivers 1~5 has an output terminal connected to a gate electrode of a power MOS tube (M1~M5) in the corresponding current path, to control the power MOS tube to be turned on and off according to the output signal of the enable terminal of the logic control section 300.

The switch section 500 has an input control terminal connected to an output terminal of the power drive section 400, and is configured to control the LED loads to be turned on and off. As shown in FIG. 1, the switch section 500 includes a plurality of power MOS tubes, for example M1~M5, respectively disposed in the first to fifth current paths. Each of the power MOS tubes has a gate electrode connected to the output terminal of the power tube driver in the corresponding current path, a drain electrode connected to the LED load in the corresponding current path and a source electrode connected to a drain of the MOS tube M6 in the constant current section 600. When each of the power MOS tubes is switched on, the LED load in the corresponding current path is turned off. When the power MOS tubes are successively switched off, the LED loads in the corresponding current paths are successively turned on. In the present invention, the power MOS tubes M1~M5 are preferably high-voltage power tubes which can endure a voltage higher than the maximum threshold of all of the LED loads.

The LED lighting drive circuit of the present invention also includes the constant current section 600, configured to provide a constant current for the drive circuit. As shown in FIG. 1, the constant current section 600 includes voltage dividing resistors Ra and Rb, an error amplifier AMP, a MOS M6 and a sampling resistor $R_{set}$, wherein the resistor Ra has a terminal connected to the power supply (a half sine wave from a commercial electric supply through a bridge rectifier) and another terminal connected to a terminal of Rb and a positive input terminal of the error amplifier AMP. Another terminal of Rb is connected to the reference ground. The error amplifier AMP has a negative input terminal connected to a source electrode of the MOS tube M6 and a terminal of the sampling resistor $R_{set}$, and an output terminal connected to a gate electrode input terminal of the MOS tube M6. Another terminal of the sampling resistor $R_{set}$ is connected to the reference ground. A drain electrode of the MOS tube M6 as an output terminal is connected to the switch section 500. The voltage dividing resistors Ra and Rb are configured to divide the sine-waved supply voltage to a voltage appropriate for the operation of the error amplifier AMP, and the voltage resulted from the dividing varies in a half sine wave form with the supply voltage. When the current is in a normal operation, the error amplifier has its positive input voltage equal to its negative input voltage, then a current passing through the sampling resistor $R_{set}$ is $V_{AMP}/R_{set}$. As the supply voltage varies, a current passing through the LEDs varies accordingly. Through the constant current section 600, the current passing through the LED strings varies in a half sine wave form with the input AC power supply and is maintained at a constant effective value. The effective value of the current can be adjusted through the resistor $R_{set}$.

Hereinafter, the operation principle of the LED lighting drive circuit of the present invention will be described with reference to FIGS. 1 to 3.

The supply voltage is a half sine wave from a commercial electric supply through a bridge rectifier. When the supply voltage is 0, each of the comparators COMP1~COMP5 outputs "0". Through the NOR gates and the inverters in the logic control section 300, each of the enable terminals E1, E2, E3, E4 and E5 of the logic control section 300 outputs a high voltage level "1". Through the driving of the power tube drivers 1~5, each of the power MOS tubes M1~M5 is controlled to be switched on. However, since the supply voltage is 0, less than the threshold voltage for turning on the LED lights, so the LED strings are turned off. With the increase of the supply voltage, the light string LED1 is firstly turned on.

With the further increase of the supply voltage, due to the characteristic of LED devices, the light string LED1 will maintain its voltage. When the supply voltage reaches the threshold voltage for turning on both of the LED lights LED1 and LED2, with set resistances of the resistors in the voltage dividing section 100, a voltage VP1 at the positive terminal of the comparator COMP1 can firstly increase to be higher than the reference voltage VREF at its negative terminal. The comparator COMP1 outputs a high voltage level "1", through the NOR gate 201, then the enable terminal E1 in the corresponding current path outputs a low voltage level "0". After the driving of the power tube driver 1, the power MOS tube M1 is controlled to be switched off. At this time, the power MOS tube M2, M3, M4 and M5 are maintained as being switched on and the high-voltage groups of LEDs LED1 and LED2 are turned on to emit light. The current through the LEDs flows to the ground through M2, M6 and $R_{set}$. The instantaneous current is:

$$I = \frac{V_{AMP}}{R_{set}}$$

Where $V_{AMP}$ is the instantaneous voltage at the positive terminal of the error amplifier AMP.

Afterwards, the supply voltage continues to increase to the threshold voltage for turning on LED1, LED2 and LED3. Due to the voltage dividing of the resistors, the voltage at the terminal VP2 of the comparator COMP2 increases to be higher than the reference voltage VREF at its negative terminal. The output of the comparator COMP2 jumps to "1", through the NOR gate 202 and the inverters 101 and 102, the enable terminal E2 outputs "0", to switch off the power MOS tube M2. The power tubes M3, M4 and M5 are maintained as being switched on. At this time, the high-voltage groups of LEDs LED1, LED2 and LED3 are turned on. The current through the LEDs flows to the ground through M3, M6 and $R_{set}$. The instantaneous current is:

$$I = \frac{V_{AMP}}{R_{set}}$$

Where $V_{AMP}$ is the instantaneous voltage at the positive terminal of the error amplifier AMP.

Afterwards, the supply voltage continues to increase, the enable terminals E3 and E4 in the other current paths successively output a low voltage level, to successively switch off the MOS tubes M3 and M4 and successively turn on LED4 and LED5.

When the supply voltage reaches a maximum value (a peak value of a half sine wave) and then starts to decrease, the enable terminals E4, E3, E2 and E1 successively outputs a high voltage level to successively switch on the power MOS tubes M4, M3, M2 and M1, such that the number of LED strings being turned on is successively decreased, and such cycle repeats.

In addition, during the whole process of the variation of the supply voltage, the enable terminal E5 in the last path (i.e. the fifth current path) is maintained at a high voltage level such that the MOS tube M5 is maintained as being switched on. When each of the MOS tubes MN (N<5) is switched off, LED in the path corresponding to M5 is turned on; and when any one of the MOS tubes MN (N<5) is switched on, the LED in the path corresponding to M5 is turned off.

Since the variation frequency of the voltage is faster than the recognition frequency of human eyes, flickering cannot be observed in the whole process. Moreover, with the increase and decrease of the voltage, the power tube M5 is always in a switch-on state.

It can be seen from the above operation principle that, no voltage transformer is employed in the circuit. With the variation of the voltage, the high voltage LEDs are successively turned on, then successively turned off, and such cycle repeats. Since the variation frequency of the voltage is sufficiently faster than the recognition frequency of human eyes, and the effective value of the current is kept constant during the process, the whole LED matrix emits uniform and stable lights.

Figure 4:
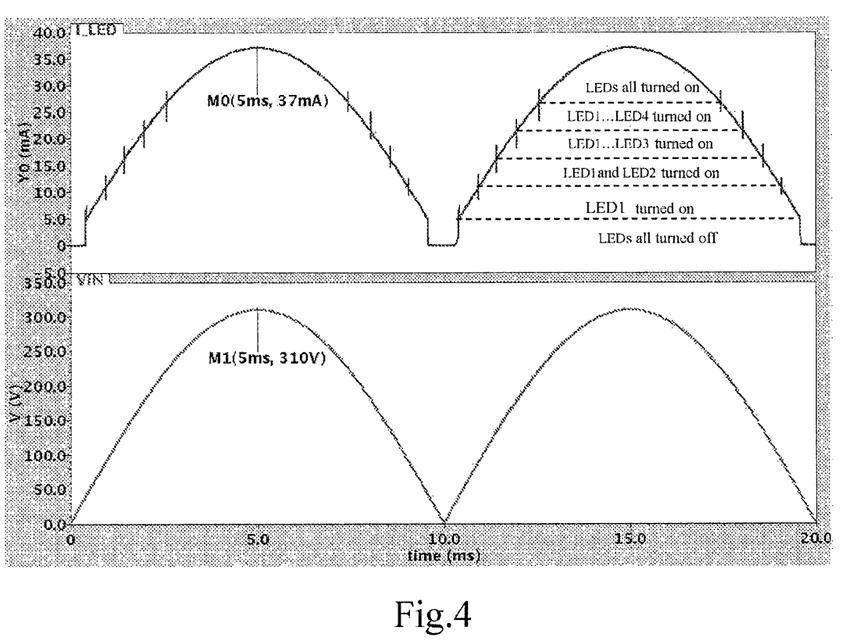
FIG. 4 is a graph of simulation current and voltage profiles of the LED lighting drive circuit according to the present invention.

FIG. 4 is a graph of simulation current and voltage profiles of the LED lighting drive circuit according to the present invention. As shown in FIG. 4, the voltage is a 220 V AC wave which is full-wave rectified with a peak value of 310 V. When the voltage reaches the threshold of the first group of LEDs, a current will occur on the LEDs. Afterwards, the wave of the current varies in a half sine wave form with the supply voltage with a frequency of 100 Hz. Since the effective value of the current is kept constant during the process, it can ensure that the LED matrix emits uniform and stable lights. Moreover, since the input current and voltage of the circuit are in a half sine wave form and vary simultaneously, the circuit can achieve a desirable power factor.

It should be understood that, the above specific embodiments of the present invention are merely for illustration or explanation of the present invention, and not constitute restriction of the present invention. Therefore, any modification, equivalent replacement, improvement and the like without departing from the spirit and scope of the present invention falls within the protective scope of the present invention. In addition, the appended claims of the present invention are intended to cover all the alterations and modifications within the scope and mete of the appended claims and their equivalents.

What is claimed is:

1. An LED lighting drive circuit, configured to supply power to N groups of LED loads, the LED lighting drive circuit comprising N current paths, N groups of LEDs, and a constant current section, N being an integer no less than 2, the N current paths comprising:
   a voltage dividing section, connected to a half sine wave power supply, and configured to reduce a supply voltage of each of the N current paths to a voltage available for a corresponding current path;
   a comparator section, comprising N comparators for the N current paths, each of the comparators having an input terminal connected to an output terminal of the voltage dividing section, and another terminal connected to a reference voltage and configured to output a control signal when a voltage varies;
   a logic control section, having N input terminals connected to N output terminals of the comparator section and configured to output N enabling signals according to the control signal outputted by the comparator section;
   a power drive section, having N input terminals connected to N output terminals of the logic control section and configured to provide N voltages according to the N enabling signals; and
   a switch section, comprising N switch elements, the N switch elements having N input terminals connected to N output terminals of the power drive section and configured to be switched off or on and thereby to control the N groups of LEDs to be turned on or off according to the N voltages provided by the power drive section,
   wherein the logic control section is configured to control the N switch elements to be successively switched off and successively switched on through logic control,
   a first group of LEDs of the N groups of LEDs has a terminal connected to the half sine wave power supply and another terminal connected to a first current path and a terminal of a second group of LEDs; an $i^{th}$ group of LEDs has a terminal connected to an $(i-1)^{th}$ group of LEDs and an $(i-1)^{th}$ current path, and another terminal connected to an $(i+1)^{th}$ group of LEDs and an $i^{th}$ current path; an $N^{th}$ group of LEDs has a terminal connected to an $(N-1)^{th}$ group of LEDs and an $(N-1)^{th}$ current path, and another terminal connected to an $N^{th}$ current path; where $2 \leq i \leq (N-1)$, and
   the constant current section is connected between the half sine wave power supply and the switch section such that a current passing through the N groups of LEDs varies in a half sine wave form with the input half sine wave power supply and has an effective value being kept constant.

2. The LED lighting drive circuit according to claim 1, wherein the voltage dividing section comprises N voltage dividing resistors connected in series between the power supply and a ground, except that a first voltage dividing resistor R1 is only connected to a comparator of the first current path at its negative terminal close to a ground terminal; and an $i^{th}$ voltage dividing resistor Ri is connected to a comparator of the $(i-1)^{th}$ current path at its positive terminal close to a power supply terminal and connected to a comparator of the $i^{th}$ current path at its negative terminal, where $i \leq N$.

3. The LED lighting drive circuit according to claim 1, wherein each of the comparators in the comparator section has a positive terminal connected to a negative terminal of a voltage dividing resistor of a corresponding current path, and a negative terminal connected to a constant reference voltage; when the supply voltage increases, voltages at the positive terminals of the N comparators successively increase to be higher than the reference voltage, such that the N comparators successively output a high voltage level; and when the supply voltage decreases, voltages at the positive terminals of the N comparators successively decrease to be lower than the reference voltage, such that the N comparators successively output a low voltage level.

4. The LED lighting drive circuit according to claim 1, wherein the logic control section sequentially comprises one NOR gate in the first current path, one NOR gate and two inverters in each of the $i^{th}$ current path, where $2 \leq i \leq (N-1)$ and three inverters in the $N^{th}$ current path, each NOR gate having an input terminal connected to the output terminal of a comparator in a corresponding current path and another input terminal connected between two inverters close to the output terminal of the logic control section.

5. The LED lighting drive circuit according to claim 1, wherein the switch elements are power MOS tubes, each of the power MOS tubes having a gate electrode connected to an output terminal of the power drive section to control the power MOS tube to be switched on and off according to an enabling signal, a drain electrode connected to the N groups of LEDs, and a source electrode connected to an output terminal of the constant current section.

6. The LED lighting drive circuit according to claim 1, wherein the constant current section comprises: voltage dividing resistors Ra and Rb, an error amplifier, a power MOS tube and a sampling resistor connected in series between the half sine wave power supply and a ground, the error amplifier having a positive terminal connected between the resistors Ra and Rb, a negative terminal connected to a source electrode of the power MOS tube and a terminal of the sampling resistor, and an output terminal connected to a gate electrode of the power MOS tube; another terminal of the sampling resistor bing connected to the ground; and a drain electrode of the power MOS tube as an output terminal being connected to the switch section.

7. The LED lighting drive circuit according to claim 6, wherein the resistor R1 has a resistance much larger than that of the resistor Ri, where $i \leq N$, and the resistor Ra has a resistance much larger than that of the resistor Rb.

8. The LED lighting drive circuit according to claim 5, wherein the Power MOS tubes are all high-voltage power tubes which can endure a voltage larger than a maximum threshold of a corresponding group of LEDs.

9. The LED lighting drive circuit according to claim 3, wherein the reference voltage at the negative terminals of the comparators is supplied by other power supply module with a constant voltage.

10. The LED lighting drive circuit according to claim 6, wherein the constant current section outputs an instantaneous current:

$$I = \frac{V_{AMP}}{R_{set}}$$

where $V_{Amp}$ is an instantaneous voltage at a positive terminal of the error amplifier, and $R_{set}$ is a resistance of the sampling resistor.

* * * * *